J. J. O'BRIEN.

PERPETUAL CALENDAR.

APPLICATION FILED NOV. 22, 1912.

Reissued July 8, 1913.

13,593.

2 SHEETS-SHEET 1.

Inventor

John J. O'Brien,

Witnesses

James Cronin

John A. Donegan.

By Geo. A. Pegrue,

Attorney

J. J. O'BRIEN.

PERPETUAL CALENDAR.

APPLICATION FILED NOV. 22, 1912.

Reissued July 8, 1913.

13,593.

2 SHEETS—SHEET 2.

Inventor

John J. O'Brien.

Witnesses

C. James Crown

John A. Donovan

By Jas. A. Bayne.

Attorney

UNITED STATES PATENT OFFICE.

JOHN JAMES O'BRIEN, OF NEW YORK, N. Y., ASSIGNOR, BY DIRECT AND MESNE ASSIGNMENTS, TO TOWER MANUFACTURING & NOVELTY CO., OF NEW YORK, N. Y., A CORPORATION OF NEW YORK.

PERPETUAL CALENDAR.

13,593. Specification of Reissued Letters Patent. Reissued July 8, 1913.

Original No. 1,029,455, dated June 11, 1912, Serial No. 634,270. Application for reissue filed November 22, 1912. Serial No. 732,957.

*To all whom it may concern:*

Be it known that I, JOHN JAMES O'BRIEN, a citizen of the United States, residing at New York city, in the county o New York and State of New York, hav invented certain new and useful Improvements in Perpetual Calendars, of which the following is a specification.

Figure 1:
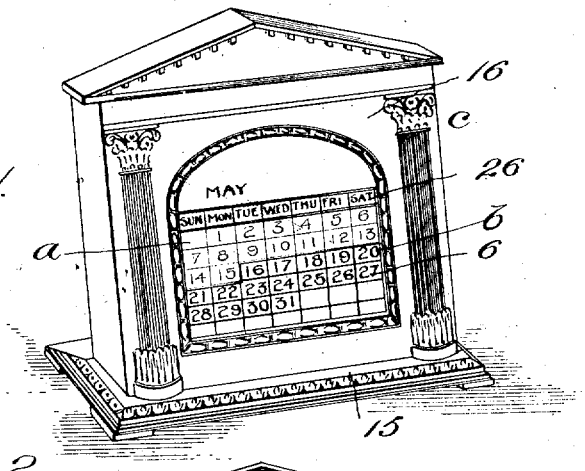
Figure 2:
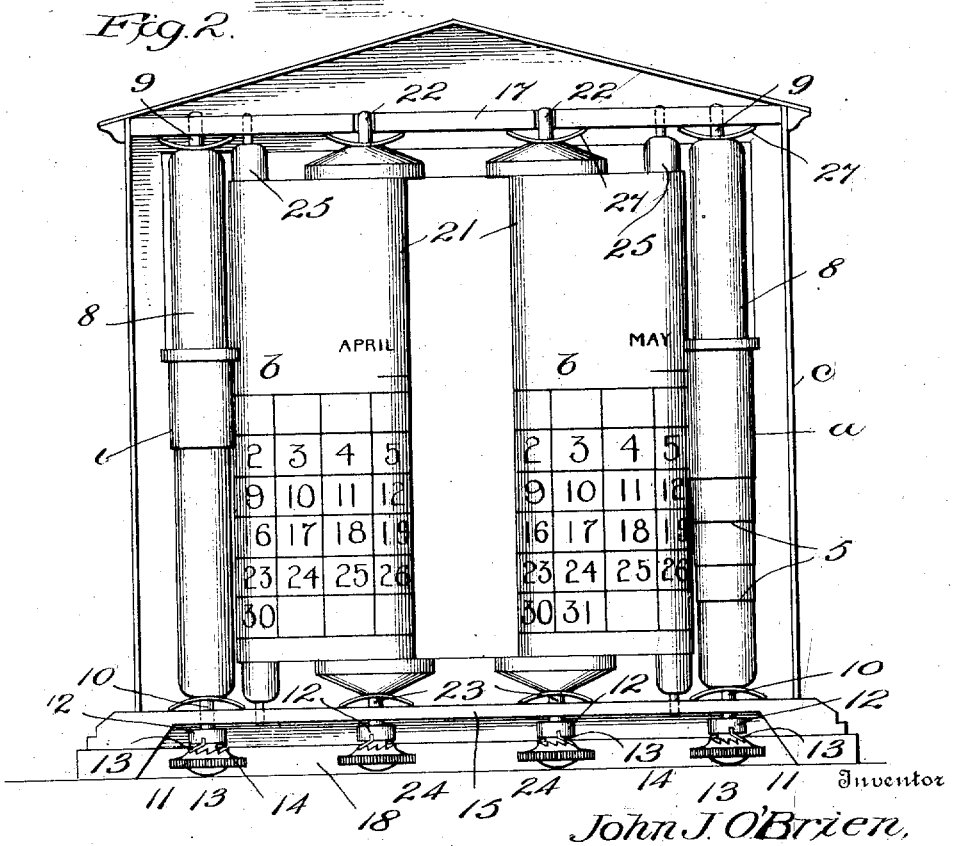
Figure 3:
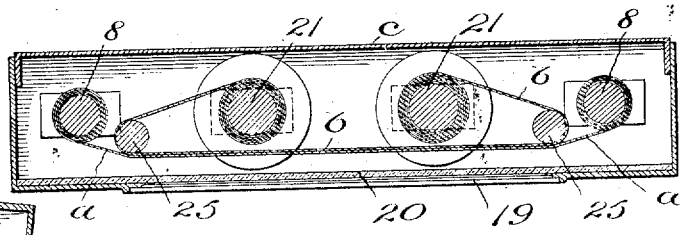
Figure 4:
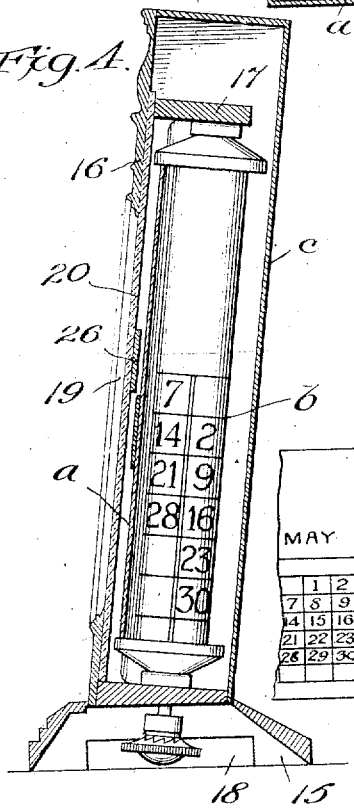
Figure 5:
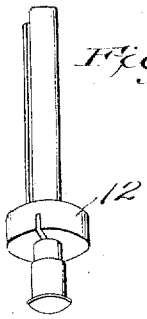
Figure 6:
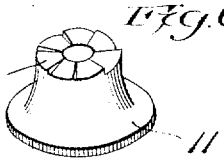
Figure 7:
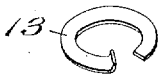
Figure 8:
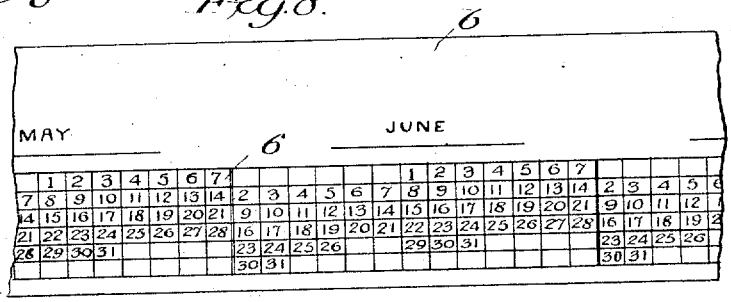
Figure 9:
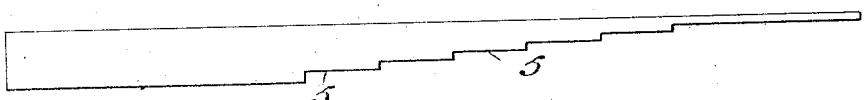
Figure 10:
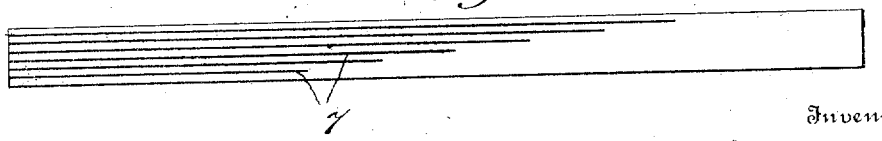

The general object of the invention is to adapt a calendar for indicating the present and the past days of a month. And to this end the invention consists in certain combinations, details of construction and arrangement of parts hereinafter more fully described in the accompanying specification and illustrated in the accompanying drawings forming a part of the specification and in which, Figure 1 is a perspective of one embodiment of my invention. Fig. 2 is an enlarged rear elevation of the same. Fig. 3 is a sectional plan on the line 3—3 of Fig. 2. Fig. 4 is a cross section of the same on the line 4—4 of Fig. 2. Fig. 5 is an enlarged perspective of the lower portion of the roller shaft. Fig. 6 is a perspective view of the knob for turning the roller. Fig. 7 is a view similar to Fig. 6 of the spring pawl used in connection with the knob and the roller shaft. Fig. 8 is a face view of a part of the month sheet. Fig. 9 is a reduced face view of the cancellation web. Fig. 10 is a view similar to Fig. 9 of a modified form of web.

One feature of my invention resides in arranging a cancellation web indicated by *a* in Fig. 4 so as to be moved over the face of the month sheet *b* and adapting the cancellation web *a* to cross out, cancel or partly obscure the characters on the month sheet and to provide means for adjusting such cancellation device so that it will indicate by its adjusted position, the present and past days of the month.

As shown in Fig. 9 the cancellation device may be made of transparent or translucent material such as tracing cloth, and formed with cut-out portions 5—5 arranged in step form and extending so as to conform to the direction of extension of the rows of characters 6 on the month sheet *b*; that is to say, that if the said rows are columnwise as is customary with some types of calendars, or horizontal as is customary with others and as shown in the drawings, then the steps will extend to correspond to the direction of extension of the said rows. Or as shown in Fig. 10 the cancellation device may as before stated, be formed of transparent or translucent material. But in lieu of the cut-away portions indicated by 5—5 in Fig. 9, the means for effecting the cancellation of the characters consists of colored lines 7, these lines being arranged parallel and in stepped relation or echelon at one end, and corresponding in number to the number of rows or characters on the month sheet and also extending in a direction to correspond to the direction of extension of the said rows as previously pointed out for Fig. 9.

Associated with the cancellation device is a carrier which is adapted for supporting, moving and adjusting the said cancellation device. In the embodiment shown the carrier is made up of a pair of rolls 8—8 to which the opposite ends of the cancellation device are connected and which operate when turned, to wind such cancellation device onto one from the other.

9—9 and 10—10 are trunnions on the ends of the rolls, the trunnions 10 being somewhat elongated with respect to the trunnions 9 and terminally provided with milled disks or knobs 11—11 which are arranged to freely rotate on the said trunnions 10—10. Positioned between the knobs and adjacent ends of the rolls are washers 12—12 which are fast on the trunnions and which carry spring pawls 13—13 preferably of the type shown in Fig. 7, these pawls being arranged so as to engage with ratchet teeth 14—14 on the knobs 11—11. The ratchet teeth of each knob are opposed to those of the other knob, whereby to adapt each of said knobs for turning the rolls and the cancellation device in a direction opposite to that in which these parts are turned by the other knob.

A casing *c* of suitable construction is herein shown as inclined from the vertical and resting on a base 15. The inclination of the casing is such as to throw its front wall 16 more directly into the line of vision of an observer. The trunnions 9—9 at the upper ends of the rolls 8—8 are journaled in the ends of a cross piece 17 in the casing *c* while the lower trunnions 10—10 extend through the base 15 and into a recessed portion 18 which is adapted for receiving the knobs 13, these latter being so disposed as to be readily handled by the operator.

The front wall 16 of the casing has a relatively large opening 19 which is backed by a sheet 20 of transparent material such as glass, the said sheet being secured in the casing in any preferred manner.

Located behind the cancellation device *a* is the month sheet which is arranged so as to be visible through the opening 19. The month sheet may be of any desired type such as that shown in Fig. 8, which is a fragment of a month sheet usually employed with perpetual calendars. The ends of this sheet are connected to rolls 21—21 located between the rolls 8—8 in the casing *c*. These rolls have trunnions 22—22 at their upper ends which are journaled in the cross piece 17 and at their lower ends are provided with trunnions 23—23 which extend through the base 15 and into the recess 18 and are provided with the operating knobs 24—24 and other adjusting devices which are in all respects identical to those described for the rolls 8—8. The month sheet *b* passes from the rolls 21—21 over rolls 25—25 which are arranged so as to maintain any of the monthly divisions of the said sheet in alinement with the opening 19 and to keep such sheet in juxtaposition to the cancellation device *a*. In adapting the device for use as a perpetual calendar I arrange a sheet 26 so as to aline with the space between the first row of dates and the name of the month beyond such row. This sheet 26 is stationary and by preference is fastened to the transparent sheet 20 and bears the names of the days of the week so that when using the device as a perpetual calendar, the operator may by turning the knob 24 connected to the roll 21 on the left in Fig. 3 of the drawings, in a clockwise direction, effect the winding of the month sheet on the said roll and the unwinding of the said sheet from the opposite roll. This turning may be continued until the first date is brought into alinement with the proper day on the sheet 26. This operation effects the setting of the calendar for the desired month and it will be manifest that by following out the scheme the calendar can serve for an indefinite number of years. Upon adjusting the month sheet for any given month, the roll 8 on the left in Fig. 3 is turned until the cancellating devices of the cancellation web are for the most part wound upon the roll and hidden from view behind the front wall 16 of the casing. After the passing of the first day of the month the operator turns, by means of its knob, the roller 8 on the right in Fig. 3. This has the effect of unwinding the cancellation device from the opposite roller 8 and advancing it across the opening 19. This movement on the part of the cancellation web is continued until one of the cancellating devices thereof moves across the character indicating the first day. This operation is continued after the passing of each subsequent day until all or all but the last, have been canceled. In this connection it may be stated that the canceling devices on the web are of such length as to remain visible until the last or all but the last date has been canceled. Upon the first day of the succeeding month the operator rewinds the cancellation web as first described and adjusts as before described, the month sheet for the succeeding month.

In order to prevent the too free rotation of the various rolls, I provide resilient friction devices 27 which, as shown in Fig. 2, are bow-shaped in contour and adapted for receiving the trunnions of the rolls and bearing on the ends of said rolls and the adjacent surfaces of the casing.

What is claimed as new is:

1. A perpetual calendar, comprising a fixed front bearing the names of the days of the week, a movable web behind the said front and extending below the same, the web being provided with numerals for indicating the days of each month and in register with the said names of the days of the week, the said web being provided with the names of the months of the year, each name being arranged to indicate the numerals for the corresponding month, and a second single web operating over the first-named web and provided with means whereby to move continuously and indicate the past days of the month.

2. A perpetual calendar, comprising a fixed front bearing the names of the days of the week; and a movable web behind the said front and extending below the same, the web being provided with numerals for indicating the days of each month and in register with the said names of the days of the week, the said web being provided with the names of the months of the year, each name being arranged to indicate for the numerals for the corresponding month, and a second web of transparent material movable over the said first-named web and having cut-out portions arranged in step form to indicate all the past days of the month.

3. In a calendar, the combination with the usual month sheet, of a movable web provided with a series of cancellation elements arranged in uniform progressive stepped relation, and means for moving said web over said month sheet in such a manner as to successively cover the figures representing past days.

JOHN JAMES O'BRIEN.

Witnesses:

KATHARINE C. MEAD,

GEO. A. BYRNE.